US012620144B2

(12) United States Patent
Moyal et al.

(10) Patent No.: US 12,620,144 B2
(45) Date of Patent: May 5, 2026

(54) MIXED REALITY (MR) BASED COLOR CODE CORRECTION AND CREATION IN AN ENVIRONMENTAL SETTING

(71) Applicant: International Business Machines Corporation, Armonk, NY (US)

(72) Inventors: Shailendra Moyal, Pune (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 17/944,400

(22) Filed: Sep. 14, 2022

(65) Prior Publication Data

US 2024/0087182 A1 Mar. 14, 2024

(51) Int. Cl.
| | |
|---|---|
| *G06T 11/10* | (2026.01) |
| *G06T 7/70* | (2017.01) |
| *G06T 7/90* | (2017.01) |
| *G06V 20/20* | (2022.01) |

(52) U.S. Cl.
CPC .............. *G06T 11/10* (2026.01); *G06T 7/70* (2017.01); *G06T 7/90* (2017.01); *G06V 20/20* (2022.01); *G06T 2207/10024* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 2007/0008556 A1* | 1/2007 | Kagawa | ............... H04N 1/60 |
| | | | 358/1.9 |
| 2011/0040572 A1* | 2/2011 | Chmiel | ............... G16H 40/20 |
| | | | 715/764 |
| 2016/0240125 A1 | 8/2016 | Sridharan et al. | |
| 2016/0241848 A1* | 8/2016 | Ramakrishnan | ........ G06T 7/001 |
| 2020/0302656 A1* | 9/2020 | Kumar | ............... G06T 7/90 |
| 2020/0331146 A1* | 10/2020 | Vu | ............... G06T 19/20 |

FOREIGN PATENT DOCUMENTS

| | | |
|---|---|---|
| EP | 3482887 A1 | 5/2019 |
| KR | 20220060468 A | 5/2022 |
| WO | 2021155153 A1 | 8/2021 |

OTHER PUBLICATIONS

Hassani et al., "Investigating color appearance in optical see-through augmented reality," Wiley Color Research & Application, 2019, pp. 1-16.

(Continued)

*Primary Examiner* — Tapas Mazumder
(74) *Attorney, Agent, or Firm* — Stosch Sabo

(57) ABSTRACT

A computer-implemented method includes receiving an image of an area, identifying an item in the area, determining an intended color of the item according to a predefined color code, analyzing the image for determining if the intended color of the item is diminished on and/or absent from the item, and outputting a mixed reality (MR) image of the area in which the intended color is overlayed on the item in response to determining that the intended color of the item is diminished and/or absent.

20 Claims, 7 Drawing Sheets

400

402 — Receive an image of an area

404 — Identify an item in the area

406 — Determine an intended color of the item according to a predefined color code 408 — Analyze the image for determining if the intended color of the item is diminished on and/or absent from the item 410 — Output a mixed reality (MR) image of the area in which the intended color is overlayed on the item in response to determining that the intended color of the item is diminished and/or absent

(56) References Cited

OTHER PUBLICATIONS

Hincapie-Ramos et al., "SmartColor: Real-Time Color Correction and Contrast for Optical See-Through Head- Mounted Displays," Proceedings of the IEEE International Symposium on Mixed and Augmented Reality Science and Technology, Sep. 2014, pp. 187-194.

Wikipedia, "Generative adversarial network," Wikipedia, 2022, 33 pages, retrieved from https://en.wikipedia.org/wiki/Generative_adversarial_network.

Compliancesigns, "5S Color-Coding and Visual Standards," SafeWork Insider, 2022, 13 pages, retrieved from https://www.compliancesigns.com/blog/5s-color-coding-visual-standards/.

ISO, "01.0710 Colour coding," ISO, 2022, 3 pages, retrieved from https://www.iso.org/ics/01.070/x/ on Sep. 12, 2022.

Parker, J., "Recommended Color Coding For Industrial Environments," Performance Painting, Sep. 3, 2015, 9 pages, retrieved from https://www.performance-painting.com/blog/recommended-color-coding-for-industrial-environments.

6S Today, "What is 5S?" 5S Today, 2022, 11 pages, retrieved from https://www.5stoday.com/what-is-5s/ on Sep. 12, 2022.

Wikipedia, "Augmented reality," Wikipedia, 2022, 48 pages, retrieved from https://en.wikipedia.org/wiki/Augmented_reality.

Sharma et al., "Augmented Reality Navigation," International Journal of Engineering Research & Technology, vol. 9, No. 6, Jun. 2020, pp. 670-675.

Dickinson et al., "Algorithm to smooth Time Advance Corrections," IP.com Prior Art Database, Technical Disclosure No. IPCOM000008805D, Sep. 1, 1998, 3 pages.

* cited by examiner

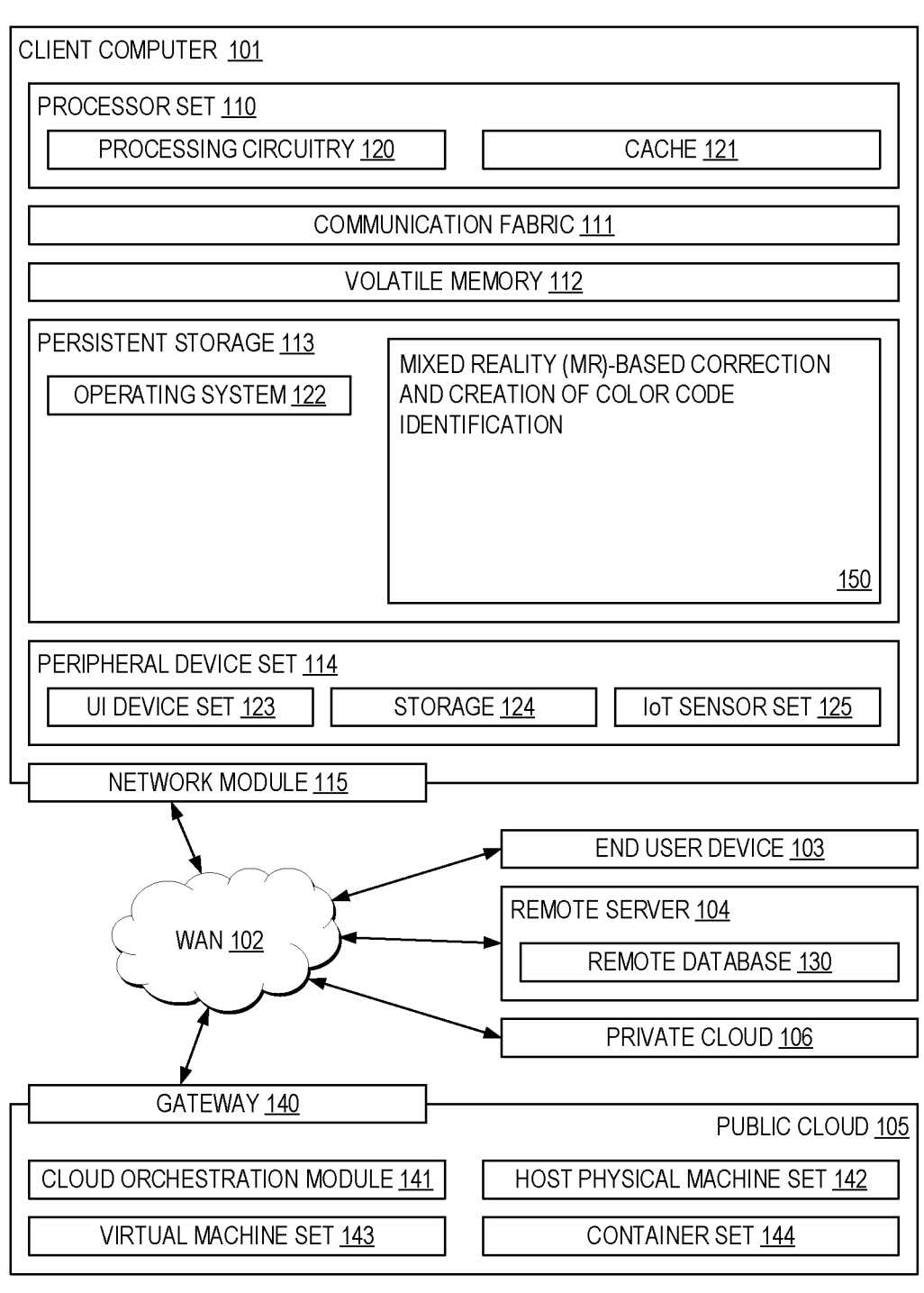

100

CLIENT COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

MIXED REALITY (MR)-BASED CORRECTION AND CREATION OF COLOR CODE IDENTIFICATION

150

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

| | |
|---|---|
| Yellow | Flammable and Oxidizing Fluids |
| Red | Fire-Quenching Fluids |
| Orange | Toxic and Corrosive Fluids |
| Green | All Water (Potable, Boiler, etc.) |
| Blue | All Air (Compressed, Lab, etc.) |
| Brown | Definable by user |
| Purple | Definable by user |
| Black | Definable by user |
| White | Definable by user |
| Gray | Definable by user |

FIG. 3

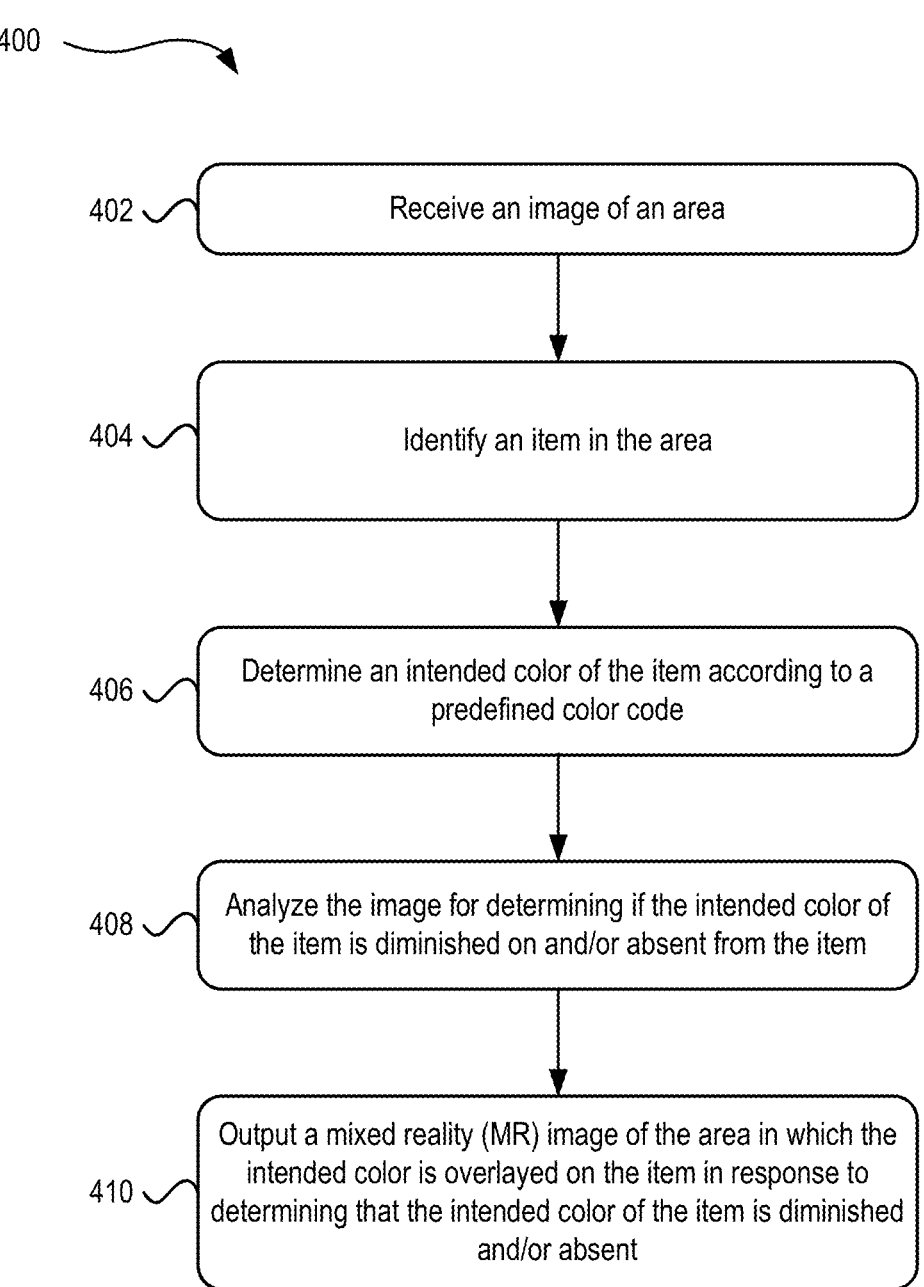

400

402    Receive an image of an area

404    Identify an item in the area

406    Determine an intended color of the item according to a predefined color code 408    Analyze the image for determining if the intended color of the item is diminished on and/or absent from the item 410    Output a mixed reality (MR) image of the area in which the intended color is overlayed on the item in response to determining that the intended color of the item is diminished and/or absent

FIG. 4

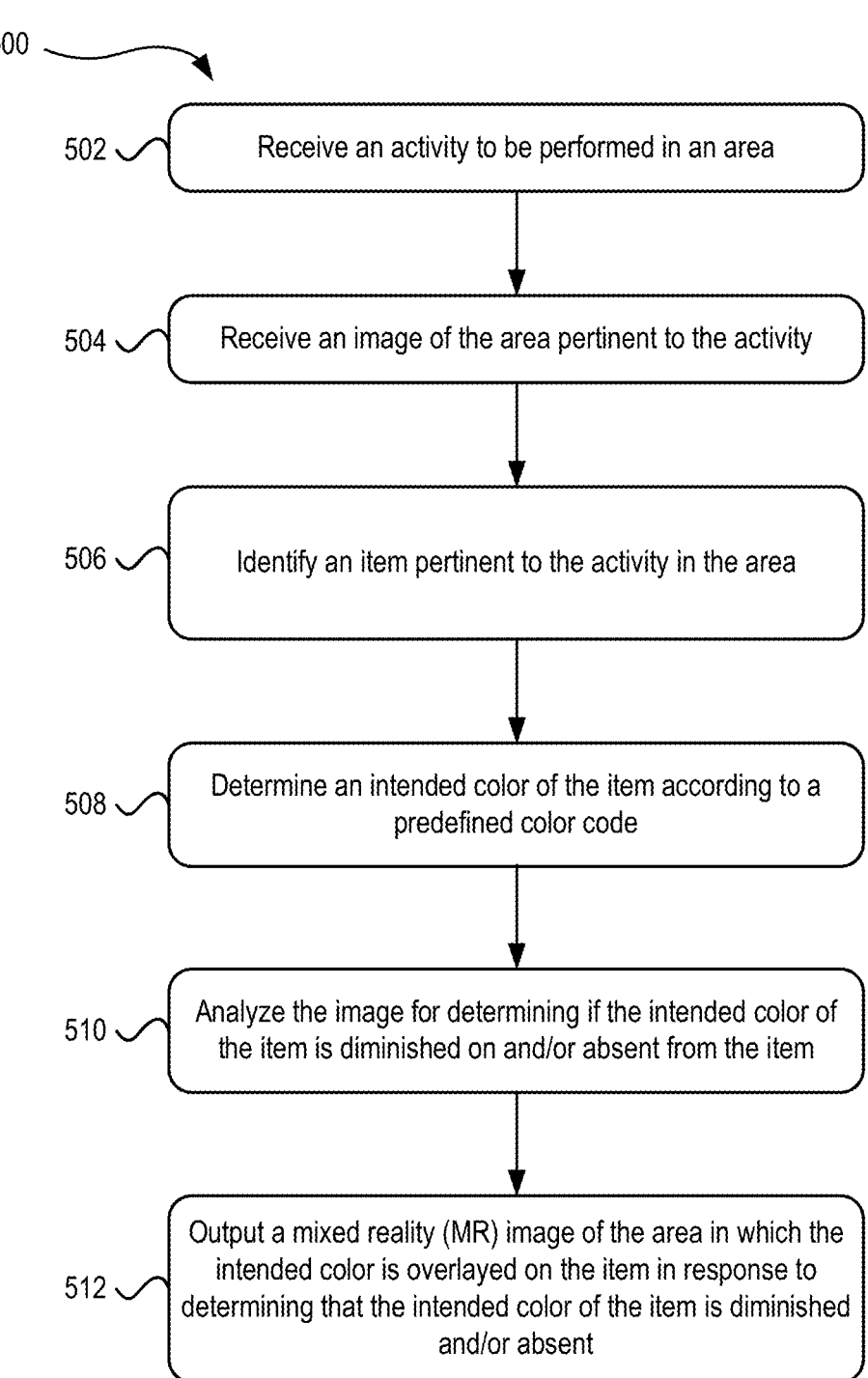

500

502 Receive an activity to be performed in an area

504 Receive an image of the area pertinent to the activity

506 Identify an item pertinent to the activity in the area

508 Determine an intended color of the item according to a predefined color code 510 Analyze the image for determining if the intended color of the item is diminished on and/or absent from the item 512 Output a mixed reality (MR) image of the area in which the intended color is overlayed on the item in response to determining that the intended color of the item is diminished and/or absent

FIG. 5

MIXED REALITY (MR) BASED COLOR CODE CORRECTION AND CREATION IN AN ENVIRONMENTAL SETTING

BACKGROUND

The present invention relates to appropriate color code in an environmental setting, and more specifically, this invention relates to a mixed reality (MR) based method and system to correct fading out color code and create color code in a MR view of a space.

In any environmental setting, for example an industrial floor, different types of color codes are used, such as a specific color on the floor, pipe fitting, machines etc., so that both human and robotic workers can recognize the surrounding, machines, etc. based on the color code. For various reasons, a color code may not be visualized properly, for instance, color may fade way over a period of a time, and/or color may not be seen through a colored fume, steam, dust etc. Thus, a method and system are needed by which a worker, robot, etc. may clearly and effectively visualize the color code of the floor, pipe fitting, machines, etc.

SUMMARY

In one embodiment, a computer-implemented method includes receiving an image of an area, identifying an item in the area, determining an intended color of the item according to a predefined color code, analyzing the image for determining if the intended color of the item is diminished on and/or absent from the item, and outputting a mixed reality (MR) image of the area in which the intended color is overlayed on the item in response to determining that the intended color of the item is diminished and/or absent.

In another embodiment, a computer-implemented method includes receiving an activity to be performed in an area, receiving an image of the area pertinent to the activity, identifying an item pertinent to the activity in the area, determining an intended color of the item according to a predefined color code, analyzing the image for determining if the intended color of the item is diminished on and/or absent from the item, and outputting a MR image of the area in which the intended color is overlayed on the item in response to determining that the intended color of the item is diminished and/or absent.

In yet another embodiment, a MR-based system includes a head-mounted MR translucent display, a camera coupled to the head-mounted MR display, a processor, and logic integrated with the processor, executable by the processor, or integrated with and executable by the processor. The logic is configured to connect to an augmented reality (AR) system for identifying items present in an area as depicted in an image captured by the camera and outputted to the display, connect to a predefined color code rule, and connect to a machine learning network module for modifying an intended color in the image of one of the items present in the area according to the predefined color code rule, where the intended color is overlayed onto the item in the image depicted on the MR display.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

FIG. 3 is a diagram of the color code of different types of pipelines.

FIG. 4 is a flow chart of a computer-implemented method for a mixed reality (MR)-based system for color correction and creation, in accordance with one embodiment of the present invention.

FIG. 5 is a flow chart of a computer-implemented method for a MR-based system for color correction and creation according to an activity, in accordance with one embodiment of the present invention.

DETAILED DESCRIPTION

Figure 2:
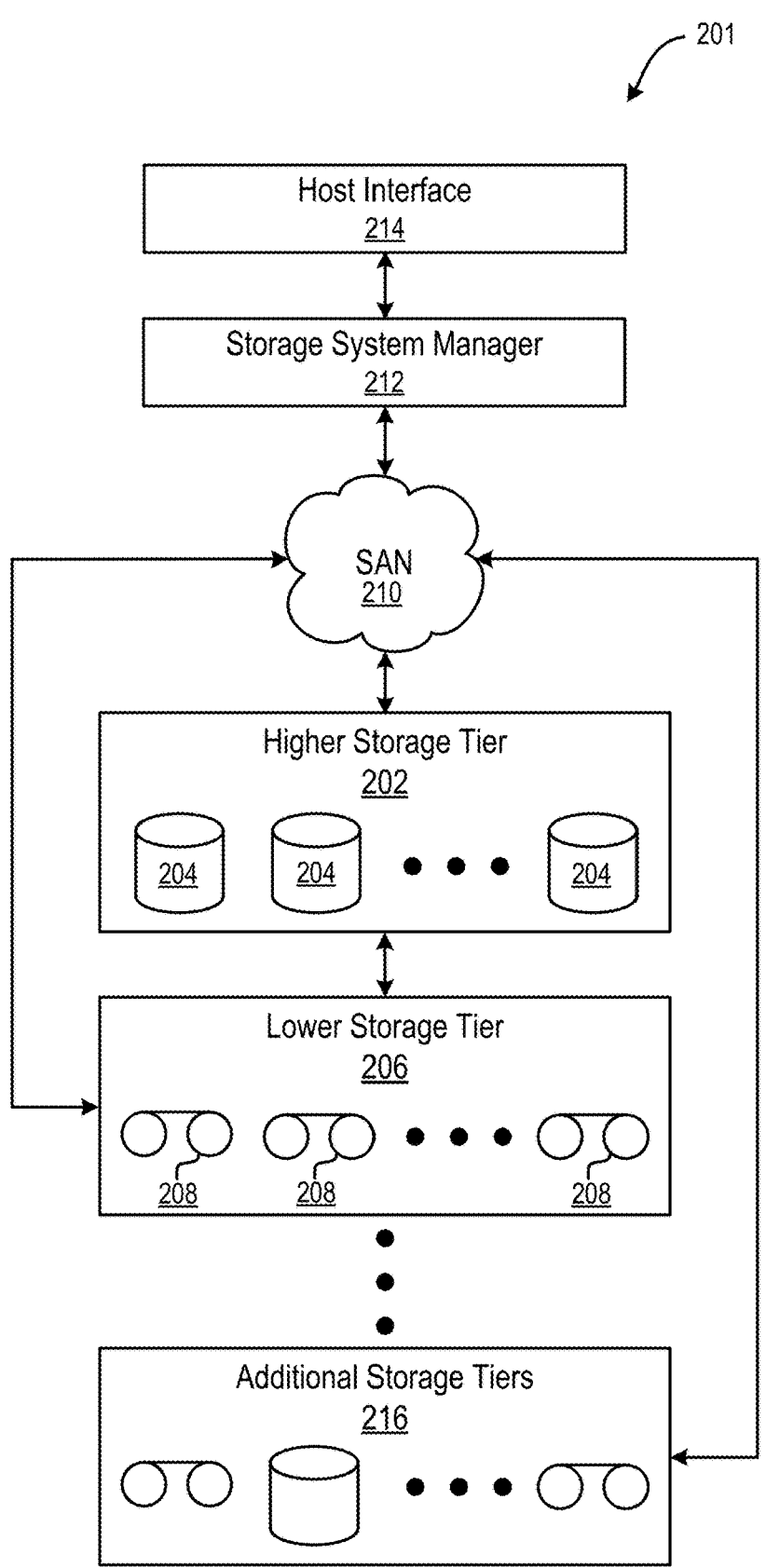
FIG. 2 is a diagram of a storage system, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for color code correction and creation using a mixed reality (MR)-based method in an environmental setting.

In one general embodiment, a computer-implemented method includes receiving an image of an area, identifying an item in the area, determining an intended color of the item according to a predefined color code, analyzing the image for determining if the intended color of the item is diminished on and/or absent from the item, and outputting a mixed reality (MR) image of the area in which the intended color is overlayed on the item in response to determining that the intended color of the item is diminished and/or absent.

In another general embodiment, a computer-implemented method includes receiving an activity to be performed in an area, receiving an image of the area pertinent to the activity, identifying an item pertinent to the activity in the area, determining an intended color of the item according to a predefined color code, analyzing the image for determining if the intended color of the item is diminished on and/or absent from the item, and outputting a MR image of the area in which the intended color is overlayed on the item in response to determining that the intended color of the item is diminished and/or absent.

In yet another general embodiment, a MR-based system includes a head-mounted MR translucent display, a camera coupled to the head-mounted MR display, a processor, and logic integrated with the processor, executable by the processor, or integrated with and executable by the processor. The logic is configured to connect to an augmented reality (AR) system for identifying items present in an area as depicted in an image captured by the camera and outputted to the display, connect to a predefined color code rule, and connect to a machine learning network module for modifying an intended color in the image of one of the items present in the area according to the predefined color code rule, where the intended color is overlayed onto the item in the image depicted on the MR display.

A list of acronyms used in the description is provided below.

ANSI American National Standards Institute
AR Augmented Reality
ASIC Application specific integrated circuit
CPU Central processing unit
FPGA Field programmable gate array
GAN Generative Adversarial Network
ISO International Organization for Standardization
IoT Internet of things
MR Mixed Realty
OSHA Occupational Safety and Health Administration Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a code for mixed reality (MR)-based correction and creation of color code identification in an environment, e.g., block 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Now referring to FIG. 2, a storage system 201 is shown according to one embodiment. Note that some of the elements shown in FIG. 2 may be implemented as hardware and/or software, according to various embodiments. The storage system 201 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 201. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 201 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 201 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 201) may include logic configured to receive a request to open a data set, logic configured to determine if the requested data set is stored to a lower storage tier 206 of a tiered data storage system 201 in multiple associated portions, logic configured to move each associated portion of the requested data set to a higher storage tier 202 of the tiered data storage system 201, and logic configured to assemble the requested data set on the higher storage tier 202 of the tiered data storage system 201 from the associated portions.

Of course, this logic may be implemented as a method on any device and/or system or as a computer program product, according to various embodiments.

In any industrial floor, appropriate color code is used for recognition of various objects in an area, e.g., surrounding a worker. The color code identifies floor, pipeline, machine, etc. For example, industry uses different color standard for floor markings, such as the following colors:

Yellow—Yellow markings are the standard for normal aisle ways as well as traffic lanes within a facility. They can also be used to designate work cells.

White—White markings will designate where different equipment will be placed. This can include carts, trash cans, and other items.

Blue/Green/Black—Any materials or components that are used in the production process. This can also include work-in-progress items and even finished goods.

Orange—Items that need to be held for inspection will be placed in areas designated with orange floor markings.

Red—Products that have defects and need to be reworked, or those that will be used as scrap.

Red & White—The red and white floor markings are used to identify areas that need to be kept clear for any type of safety or compliance reason. This could include areas around firefighting equipment, eyewash stations, and others.

Black & White—Areas that need to be kept clear for standard work to be done.

Black & Yellow—The black and yellow floor markings are for areas that could expose employees to health hazards or physical risks.

At the same time, a pipe may also be identified by different types of color code. For example, according to the American National Standards Institute (ANSI), the diagram as illustrated in FIG. 3 describes the pipe labeling standards of color code of different types of pipelines (ANSI/ASME 13.1, Creative Safety Supply 2020). Yellow indicates flammable and oxidizing fluids, red indicates fire-quenching fluids, orange indicates toxic and corrosive fluids, green indicates all water (e.g., potable, boiler, etc.). Brown indicates combustible fluids. Colors such as purple, black, white, gray, etc. may be defined by the user.

The purpose of a color code allows indication of information in situations where text based information may not be effective.

Provide zone control. Different colors may be assigned to each step in the process or by manufacturing line. Zone control allows a worker, robot, etc. to keep tools in their correct areas, working on the right surfaces, etc.

Increase traceability. The assignment of colors to zones allows easy, accurate confirmation that a tool may be misplaced, and that the tool may be quickly traced back to its point of origination.

Divide workspaces. Each shift and each section have a unique color of tools to keep track of what goes where. The unique color for each workspace results in fewer lost or misplaced tools and a lower maintenance budget.

Facilitates 5S. The 5S organizational method is renowned for keeping facilities clean and tidy at all times: sort, set in order, shine, standardize, and sustain. Color coding supports the 5S organization method by providing an ideal control measure that is easily documented and followed by workers, robots, etc. Standardization using visual cues using 5S colors results in reinforcing standards and highlighting critical information. Separates cleaning and sanitation. Separate colors for sanitation and food results in an easy visual cue that prevents cross-contact incidents. For example, heavy-duty floor cleaner is a necessity for plant floors and drains, but a brush that has been used with it should not be stored or used in near proximity to food products.

According to one embodiment, a mixed reality (MR)-based system recognizes and identifies objects located in an area, field of vision, region, etc. and identifies the color markings of these objects and whether the color of the object is fading away, the complete color is not yet ready, etc. Accordingly, an MR based system displays an image to the worker that includes the same objects with an overlay of the appropriate color, so that a worker may properly visualize the objects, area, etc. in the worker's field of vision.

Now referring to FIG. 4, a flowchart of a computer-implemented method 400 is shown according to one embodiment. The method 400 may be performed in accordance with the present invention in any of the environments depicted in FIGS, among others, in various embodiments. Of course, more or fewer operations than those specifically described in FIG. 4 may be included in method 400, as would be understood by one of skill in the art upon reading the present descriptions.

Each of the steps of the computer-implemented method 400 may be performed by any suitable component of the operating environment. For example, in various embodiments, the method 400 may be partially or entirely performed by a mixed-reality (MR) apparatus, a MR system, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where an image of the area is received. In one approach, a camera associated with a user captures the image. In one approach, the method 400 is implemented on an apparatus worn by the user. The apparatus may comprise the camera and a display for outputting a mixed reality (MR) image of the area. The apparatus may be worn by the user. An image of the field of vision of the user may be outputted to a display on the apparatus worn by the user so that the user can view the area hands-free, i.e., the display in front of the user's eyes. For example, the apparatus worn by the user may be a head-mounted MR glass. The display may be translucent, e.g., a glass, a plastic, etc.

In one approach, the user may be a human, such as a worker, a visitor, a delivery person, etc. In another approach, the user may be a robot.

The method includes operation 404 that identifies an item in the area. The item may be identified as one of the following: an object, an area of a floor, an infrastructure, etc. An object may be a piece a piece of machinery, a piece of furniture, a pipe, a handle, a sink, etc. An area of the floor may be a region of the floor proximate to an object, a region of floor for transport, etc. An infrastructure may be a series of machines completing a task, a layout of an activity to be performed (e.g., support beams, doorway, elevated dock, etc.), etc.

In some approaches, the method may be implemented in a designated area in which items are color coded according to a specific designation. For example, an industrial space for manufacturing, assembling, etc. In other approaches, the method may be implemented in a non-designated area in which items are not color coded. For example, a disaster area, an unexpected accident, delivery of an item to a non-designated area (e.g., an unknown warehouse, a private property, etc.), etc.

In one approach, items present in the area (e.g., in the field of the image on display) may have sensors. Operation 404 that includes identifying the item may also include receiving an IoT feed from the sensors for recognizing the items in the area as presented in the field of the image. According to one embodiment, the proposed MR-based system may analyze IoT feeds and sensor data from different machine parts and/or integration points; and from this analysis, the system may recommend a change to the color code available to be more accurate based on health condition (e.g., wear, design, etc.) of the parts and machineries.

According to one embodiment, the proposed MR-based system may have a capability to analyze the advance impact of the data available from IoT feeds from areas. In one approach, the MR-based system may propose different color codes based on identified area and impact on the same which can be shared in MR based visualization from original color codes dynamically. The IoT feed may include information being sent from specific sensors in the field of vision, for example, a sensor on a pipe sends information of the contents of the pipe, e.g., water, air, etc.

In one approach, the method may include determining a distance between the item and a user using an augmented reality (AR) system. An AR system allows items present in the real world setting (e.g., as captured in an image of the area visible to a worker) may be enhanced by computer-generated perceptual information. An AR system incorporates a combination of real and virtual objects, real-time interaction, and 3D registration of virtual and real objects. An AR system incorporated into the MR-based system may determine a distance between the item and other items in the area of view of the camera. The AR system may determine a distance between the user and the other items in relation to the item being identified for color. In some approaches, the system will identify the mobility of the user and identify the objects in view of the user as the user moves through an industrial space. For example, a worker is moving a highly flammable material across an industrial floor, the MR-based glass will display nearby hot pipes with an overlay of red color on hot pipes within 400 meters of the worker.

The field of view of the MR-based system is configured by the image captured by the camera coupled to the system. In one approach, the camera may capture items within 600 meters of the user, but the distance of the field of view may be further or nearer. In preferred approaches, the MR-based system provides an image of the entire area pertinent to the activity.

According to one approach, the proposed method may identify if the visual area is obstructed by a semi-opaque gas, fume (like steam, dust etc.), etc. and accordingly, an AR system may identify which portion of the surroundings, field of vision, region, etc. having different color is not properly visible, then the proposed MR system may improve the visual clarity of the target objects in the surroundings, field of vision, region, etc. with appropriate color, so that the worker, robot, etc. may clearly visualize the surroundings, field of vision, region, etc.

Operation 406 includes determining an intended color of the item according to a predefined color code. In various approaches, the color code is predefined according to a color code rule. The predefined color code may be a national standard color code for industry. For example, the International Organization for Standardization (ISO) has a color code standard including safety colors and safety signs. In another example, the American National Standards Institute (ANSI) and Occupational Safety and Health Administration (OSHA) have developed a set of safety colors for industrial environments. In one approach, the 5S approach for organizing spaces (5S translated form Japanese to English to sort, set in order, shine, standardize, and sustain) includes a color code to enable organization. In various approaches, the predefined color code is loaded into the logic of the processor prior to implementing the method. In one approach, the system as described herein may have logic of the color code stored in a centralized system that is connected to the MR system associated with the user.

Operation 408 includes analyzing the image for determining if the intended color of the item is diminished on and/or absent from the item. Various causes for the intended color to be diminished include age of the item resulting in a faded color, a temporary object is obscuring the item, an environmental factor is obscuring the intended color of the item. For example, the item may have a color that has faded over time and no longer has the pigment corresponding to the predefined color code, e.g., has a faded color. It is possible that some portions of the item have a diminished color and other portions of the item have no color showing at all (e.g., worn off, removed, etc.). In another example, an environmental factor such as a plume of steam, accumulation of dust, an opaque or color fume, etc. may be obscuring the intended color of the item.

In one approach, the intended color of the item may be absent because the item has not received a color marking. In one approach, the intended color of the item may be absent because the original color has completely faded. In another approach, the intended color may be absent because the steps of an activity are in the process of being created and, thus, the objects have not received a color designation. For example, an innovation of a process includes a pipe without a color designation. The system displays the pipe as the appropriate color according to the planned use of the pipe.

According to one approach, an AR glass may correct reflection of light and may show the correct color code which is not properly visible. For example, light might be coming into the area from a different direction and may distort the color presented on the object, the system may correct for reflection of light in the area being viewed by the user. Based on information received by the system, the method may correct for the reflection of light and display the correct color code overlayed on the object that may not be properly visible in the changing light.

In one approach, the intended color of the item may be adjusted in the image using a machine learning network connected to the logic of the system. For example, the color of the item may be adjusted using a Generative Adversarial Network (GAN). A GAN is a machine learning network. A GAN is based on the indirect training through a discriminator that may be another neural network that can estimate how realistic the input seems, and the discriminator may be updated dynamically. In one approach, the machine learning network, e.g., GAN identifies a correction of the intended color on the item for adjustment of the intended color in the image of the area.

Operation 410 include outputting a MR image of the area in which the intended color is overlayed on the item in response to determining that the intended color of the item is diminished and/or absent. In one approach, if the color of the item is diminished, the method may overlay the correct color according to the predefined color code onto the image of the item on the display. In another approach, if the color is absent from the item, the method will create the correct color according to the predefined color code and overlay the color onto the image of the item on the display.

For example, a pipe that contains a flammable liquid may be visualized in the image displayed to the user as having a red color, e.g., a red color is overlayed onto the image of the pipe being displayed to the viewer. In another example, a pipe is colored red in the actual space, however, the view of the pipe is obstructed by a plume of steam, dust, etc. but the sensor associated with the pipe sends information of the pipe location and designated color. The system displays a color of the pipe overlayed on the location of the pipe in the image viewed by the user, and subsequently, the color is overlayed on the plume of steam, dust, etc. so that the viewer sees the appropriate color of the pipe in the display image.

The method includes identifying a physical location of the item in the area for overlaying the intended color on the item. In one approach, the identifying of the item in the area may include identifying the physical location of the item in the image for overlaying the intended color on the item.

In one approach, based on a specific area of an activity that may not have visible color coding for various reasons (e.g., an identified area of activity, a Field of View of the worker, the identified mobility distance of the worker, etc.), the MR-based system may identify the extent of the surroundings shown with proper color coding throughout the identified surroundings.

In one approach, the method includes enhancing a brightness of the intended color of the item in the image so that the item is recognized in the area.

In one embodiment, the method may be repeated for identifying each of a plurality of items in the area of a field of an image.

According to one embodiment, the proposed MR-based system may have the capability to process historical data. In one approach, the system may generate a color code (e.g., as provided, created, etc.), record events/incident that occur, and provide a reason for the incident occurrence. In so doing, the proposed MR-based system may provide, suggest, implement, more useful color coding for a designated and/or a non-designated area based on the contextual activity as identified from the historical data, incidence occurrences, etc.

According to one embodiment, a head mounted MR system may receive an IoT feed from the area at which a specific activity will be performed, and provide a visual analysis of the area where the activity may be performed. The proposed system may refer to a specific activity and identify whether any color code in the area, region, field of vision, etc. is not properly visible/displayed according to the activity. Accordingly, the MR system may correct the same with proper color and overlay the same over the physical viewable surrounding.

Now referring to FIG. 5, a flowchart of a computer-implemented method 500 is shown according to one embodiment. The method 500 may be performed in accordance with the present invention in any of the environments depicted in FIGS. 1-4, among others, in various embodiments. Of course, more or fewer operations than those specifically described in FIG. 5 may be included in method 500, as would be understood by one of skill in the art upon reading the present descriptions.

Each of the steps of the computer-implemented method 500 may be performed by any suitable component of the operating environment. For example, in various embodiments, the method 500 may be partially or entirely performed by a mixed-reality (MR) apparatus, a MR system, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502 of receiving an activity to be performed in an area. According to one approach, the MR based method may analyze the activity to be performed in an area and determine whether the activity will be performed in an area is designated for the activity and/or is a non-designated area, e.g., an area without any color code.

After receiving the activity to be performed, the method may analyze the activity for implementing method 500. In various approaches, the analysis of the activity includes analyzing the context of the activity, e.g., determining the location of the activity, determining the criticality of the activity, identifying an area for performing the activity, identifying the types of steps included for performing the activity, etc. In some approaches, the method may include determining whether the activity includes performing the activity in a designated area and/or a non-designated area. In one approach, a non-designated area may be an area that does not have color coding according to the color code rule. In another approach, a non-designated area may be an area that is not designated for the activity. For example, an activity may include an area designated for the activity (e.g., a machine for making an item) and an area not designated for the activity (e.g., loading the item onto a delivery truck that is not associated with the manufacture of the item).

In one approach, different types of activities may be segmented with different types of steps. The system may identify the contextual priority of the tasks associated with the activity, including the sequence of tasks associated with the activity. For example, the method may determine a certain type of activity includes a known series of steps. The method may be configured for the certain type of activity and adjusted if the activity includes performing a portion of the activity in a different industrial area. For example, the method may include a display of a different color code for each step according to the configuration determined by the activity.

Operation 504 includes receiving an image of the area pertinent to the activity. A camera associated with a user of the method 500 captures the image of the area pertinent to the activity. Based on the types of the activity being performed, the MR based system may virtually segment the surrounding, recognize the objects in the area of the field of vision of the camera; and accordingly, the MR-based system may show appropriate virtual color code of the items used during performance of the activity. In a preferred approach, the MR-based system includes an apparatus worn by the user, where the apparatus includes a camera and a display for outputting an MR image of the area, for example, a head-mounted MR glass. In one approach, the user is a human, e.g., a worker, a visitor, a delivery person, etc. In another approach, the user is a robot.

For example, one approach of implementing the method in a non-designated space includes a rescue operation to be performed in a disaster area. The system analyzes the context of the area based on historical learning and identifies different types of activities to be performed, safety requirements associated with the activity, area, etc. The head-mounted apparatus (e.g., AR glass) will display an image to the user with appropriate color codes overlayed on items in the area pertinent to rescue operation. Moreover, the system may include IoT feeds, image analysis, etc. in the analysis of the disaster area.

An MR-based system provides a context for an activity in real time as the user is performing a task. The MR-based system received information that is happening while the user is performing the task. In preferred approaches, the image received by the user includes items pertinent to the activity in the peripheral vision of the user. For example, a color code is changed on a particular item that has a different color designation from previous activity (e.g., the item was used for a different activity one day prior), the MR-based system overlays the correct color for the item pertinent to the current activity on the display of the field of view of the user.

In various approaches, the method analyzes the context in the area pertinent to the activity. The analysis includes extent of completion of activities (e.g., progress in rescue operation), a change in severity pattern (e.g., determining if disaster has worsened), a change in activity sequence (e.g., determining a specific activity gains priority over another activity), etc. According to the analysis, the method will auto-adapt the appropriate color code of items displayed to the user in the MR glass.

Operation 506 includes identifying an item pertinent to the activity in the area. In one approach, the method may identify the contextual priority of the activity and the needs of appropriate color code of the items in the area, field of vision, region, etc. The system may identify the condition of the color of designated items, e.g., is the color fading, is the color obscured, etc. In one approach, an AR-enabled system may create an appropriate level of brightness in the intended color, so that the items pertinent to the context of the activity being performed in the area of the field of vision may clearly be distinguished from other items not pertinent to the activity in the same area that is outputted to the display.

As described for method 400 in FIG. 4, operation 508 of method 500 in FIG. 5 includes determining an intended color of the item according to a predefined color code. In various approaches, the color code is predefined according to a color code rule. The color of the item may be selected according to the activity to be performed with, on, etc. the item.

Operation 510 includes analyzing the image for determining if the intended color of the item pertaining to the activity is diminished on and/or absent from the item. The color may of the item pertaining to the activity may be diminished due to age of the item and the associated color, the item may be obscured by an environmental factor and/or another item, etc.

Operation 512 includes outputting a MR image of the area in which the intended color is overlayed on the item in response to determining that the intended color of the item is diminished and/or absent. The intended color is overlayed on the item in the image where the item is pertinent to an activity to be performed, being performed, etc.

In preferred approaches, operations 506 to 512 are implemented for each item pertinent to the activity to be performed before the activity is performed. In some approaches, operations 506 to 512 are implemented during the performance of the activity by a user. For example, for each item pertinent to the activity that is encountered, engaged, used, etc. by the user, operations 506 to 512 are implemented for the identified item.

According to one embodiment, a MR-based system includes a head-mounted MR translucent display, a camera coupled to the head-mounted MR display, and a processor. A logic integrated with the processor, executable by the processor or integrated with and executable by the processor, may be configured to connect to an augmented reality (AR) system for identifying items present in an area as depicted in an image captured by the camera and outputted to the display, connect to a predefined color code rule, and connect to a machine learning network module. For example, a machine learning network module (e.g., a generative adversarial network (GAN) module) provides modification of an intended color in the image of one of the items present in the area according to the predefined color code rule. The intended color is overlayed onto the item in the image depicted on the MR display.

Figures 6A, 6B:
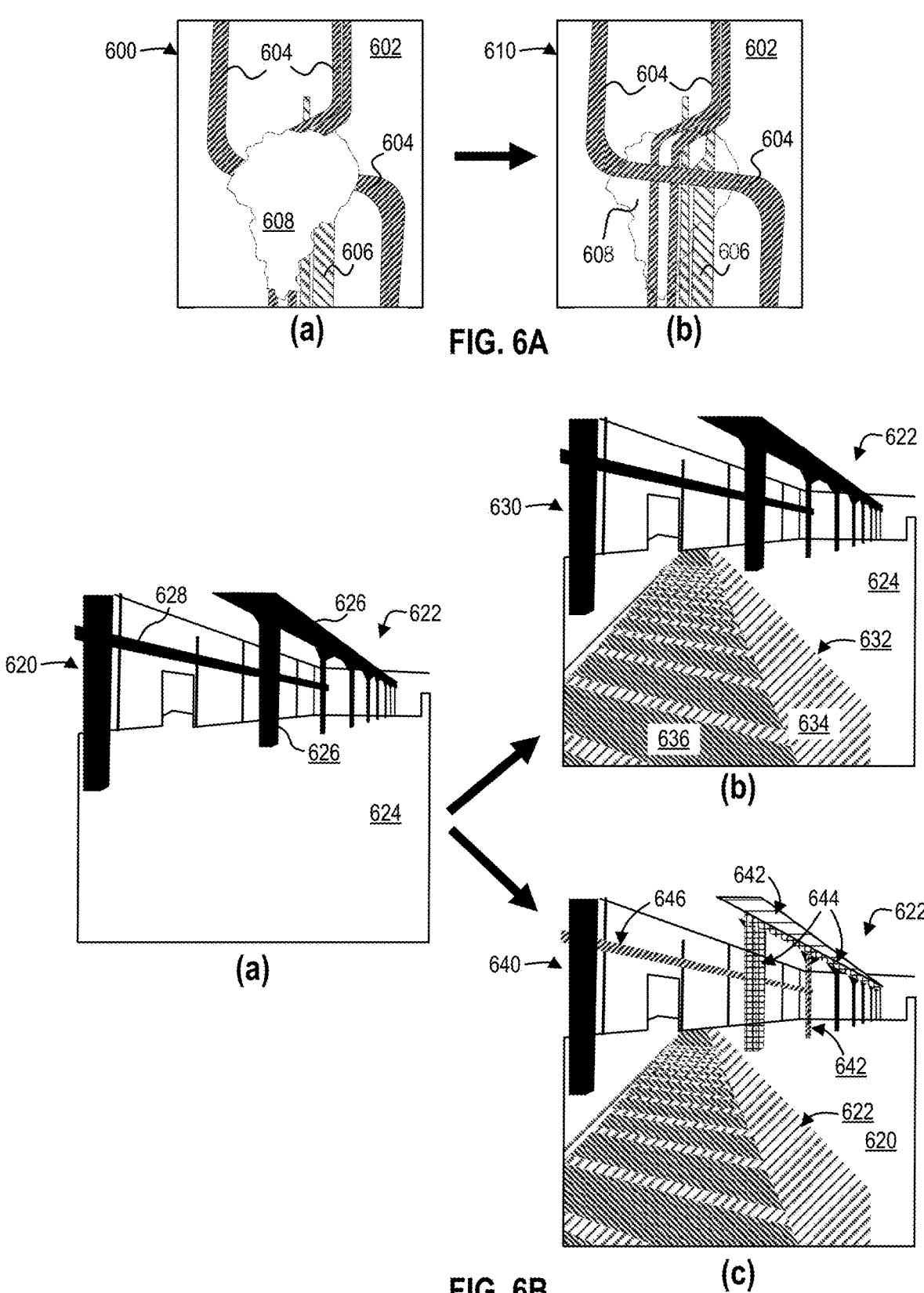
FIG. 6A are schematic drawings of color correction of objects in an area in which the objects are obscured by an environmental factor, in accordance with one embodiment of the present invention. Part (a) is a depiction of an image without color correction, and part (b) is a depiction of the MR-based image with color correction.
FIG. 6B are schematic drawings of an area where a color code is created for an activity to be performed, in accordance with one embodiment of the present invention. Part (a) is a depiction of an image of a floor area without a color code, part (b) is a depiction of the MR-based image with a color code, and part (c) is a depiction of the MR-based image with a color code created for the floor and objects pertaining to the activity to be performed.

The schematic drawings depicted in FIGS. 6A-6B illustrate an industrial floor where various color a of the surrounding area, objects, infrastructure, etc. are not properly visible. A MR-based system, as described herein, corrects the area, objects, infrastructure, etc. at the same time, simultaneously, etc. before and/or as an activity is being performed. The MR-based system surveys the surroundings of the activity, and creates the appropriate color code for an area, object, infrastructure, etc. that does not have a color code, or the color code is fading.

Part (a) of FIG. 6A is a schematic drawing of an image 600 of a series of pipes 604 in an industrial area 602. A plume 608 of steam is obscuring a view of the pipes 604 and infrastructure 606 of the area 602. Part (b) is a schematic drawing of an MR-based image 610 displayed using the computer-implemented method as described herein. The color of the pipes 604 and infrastructure 606 in the area 602 are corrected and enhanced to be clearly visible above the plume 608 of steam in the MR-based image 610.

Part (a) of FIG. 6B is a schematic drawing of an image 620 of an industrial area 622 where a color code is not present in the area 622 where an activity is to be performed. The industrial area 622 depicted in the image 620 includes a floor 624 and a series of pipes 626, 628 that may be pertinent to an activity to be performed.

In one approach, as shown in a MR-based image 630 depicted in part (b) of FIG. 6B, a path 632 may be created for the floor 624 in the area 622. The color code of a path 632 provides guidance for the transport of objects pertaining to an activity to be performed. As illustrated, the image 630 shows a path 632 with two colors, e.g., blue 636 and yellow 634.

In another approach, illustrated in part (c) of FIG. 6B, the MR-based image 640 of the area 622 may include creation of colors for existing objects in the area 622, for example, pipes 626, 628 (as shown in part (a)). According to an IoT feed of sensors of the different pipes 626, 628, data of the contents of the pipes 626, 628 allow the MR-based system to overlay a color according to the contents. The MR-based method may create specific colors to be displayed in the image 640 for the items pertinent to the activity to be performed. The user is able to visualize the color codes of the area, including the color codes in the peripheral vision of the user and assess the contents of the pipes. For example, in the MR-based image 640, the display may show the series of pipes 626 having different colors depending on the contents of the pipe being designated for the activity, e.g., a green color 642 and an orange color 644. Another set of pipes 628 may have a purple color 646. The user can then monitor the pipes for leakage, flow maintenance, etc.

Figure 7:
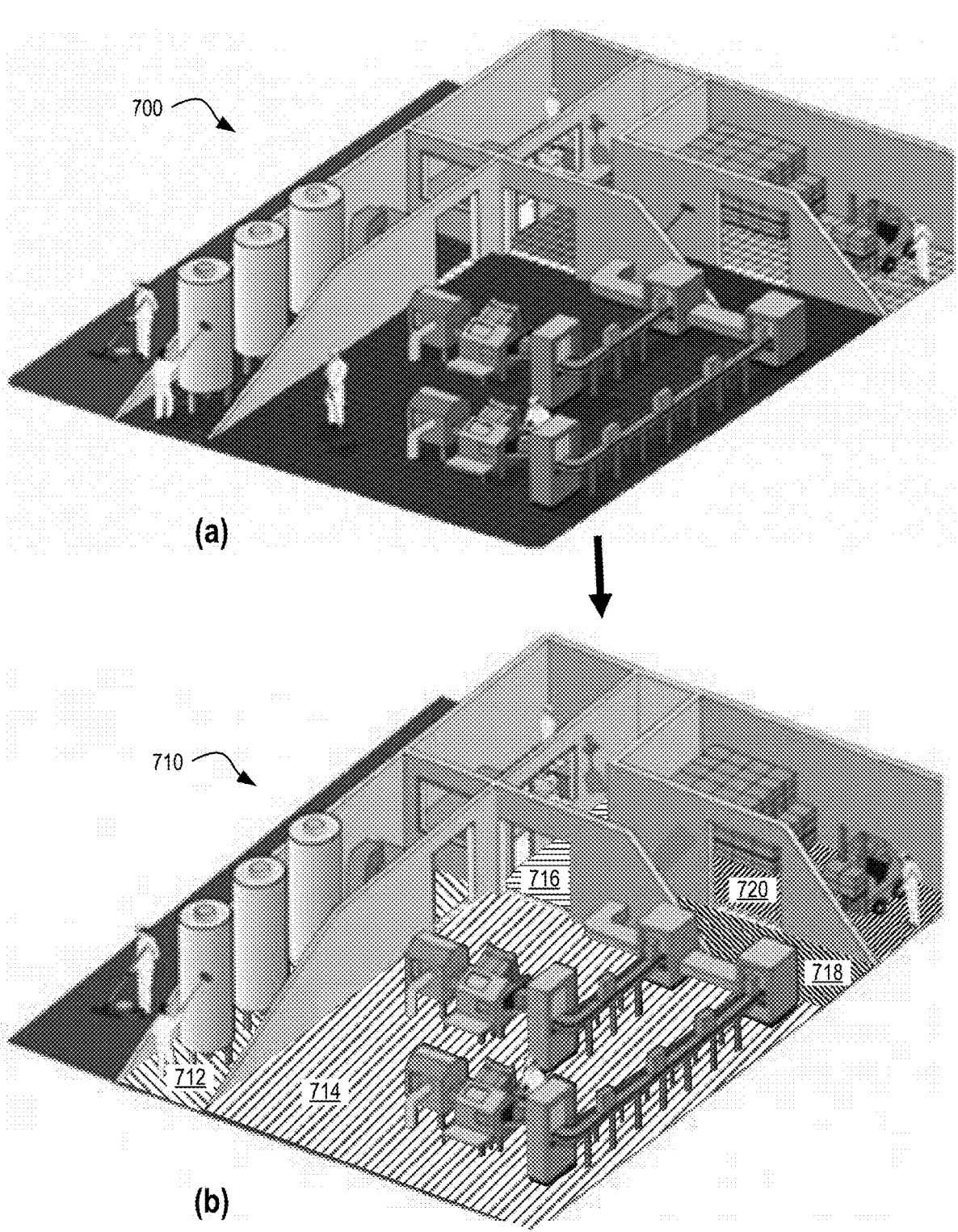
FIG. 7 is a schematic drawing of color correction and creation of an entire industrial space, in accordance with one embodiment of the present invention. Part (a) represents an area where an activity is to be performed, part (b) represents an image of the industrial space where each area for a step of the activity has color correction or color creation according to a color code.

As illustrated in FIG. 7, the method as described herein may be configured so that an entire industrial space 700 of part (a) is captured in an image 710 of part (b) where the items of the space 700 have a color according to a code. The items, e.g., floors of the industrial space 700, may be designated spaces or non-designated spaces. In one example, a head-worn MR glass system on the user displays entire objects with appropriate color so that the user sees an appropriate color in all the objects at a glance. In some approaches, showing color sequentially, e.g., one-by-one, based on the user's need may not be effective for a particular activity, so the method creates an industrial setting for an entire space according to an appropriate color code.

For example, in the image 710 of the industrial space 700, the floor for chemical storage 712 may appear as green, the floor for manufacture 714 appears as red, the floor for an exit passage 716 appears as orange, a floor of a hallway 718 connecting manufacture 714 to loading/delivery 720 appears as purple, and the floor of the loading/delivery 720 appears as yellow.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving an image of an area;
   identifying an item in the area;
   determining an intended color of the item according to a predefined color code;
   analyzing the image for determining if the intended color of the item is diminished on and/or absent from the item, wherein the intended color of the item is diminished by at least one cause selected from the group consisting of: age of the item resulting in a faded color, a temporary object obscuring the item, and an environmental factor obscuring the intended color of the item; and
   outputting a mixed reality (MR) image of the area in which the intended color is overlaid on the item in response to determining that the intended color of the item is diminished and/or absent.

2. The computer-implemented method of claim 1, wherein the item is selected from the group consisting of: an object, an area of a floor, and an infrastructure.

3. The computer-implemented method of claim 1, wherein a camera associated with a user captures the image, wherein the method is implemented on an apparatus worn by the user, wherein the apparatus comprises the camera and a display for outputting the MR image of the area.

4. The computer-implemented method of claim 1, wherein a camera associated with a user captures the image, wherein the user is selected from the group consisting of: a human and a robot.

5. The computer-implemented method of claim 1, comprising determining a distance between the item and a user using an augmented reality (AR) system.

6. The computer-implemented method of claim 1, wherein the intended color of the item is adjusted in the image using a machine learning network.

7. The computer-implemented method of claim 6, wherein the machine learning network identifies a correction of the intended color on the item for adjustment of the intended color in the image of the area.

8. The computer-implemented method of claim 1, wherein items present in the area have sensors, wherein the identifying comprises receiving an IoT feed from the sensors for recognizing items in the area.

9. The computer-implemented method of claim 1, comprising identifying a physical location of the item in the image for overlaying the intended color on the item.

10. The computer-implemented method of claim 1, comprising enhancing a brightness of the intended color of the item in the image so that the item is recognized in the area.

11. The computer-implemented method of claim 1, wherein the area includes a plurality of items, and further comprising:

identifying a second item of the plurality of items in the area;

determining an intended color of the second item according to a predefined color code;

analyzing the image for determining if the intended color of the second item is diminished on and/or absent from the second item; and outputting a mixed reality (MR) image of the area in which the intended color is overlayed on the second item in response to determining that the intended color of the second item is diminished and/or absent.

12. The computer-implemented method of claim 1, wherein the color code is predefined according to a color code rule.

13. The computer-implemented method of claim 1, wherein the intended color of the item is diminished by the age of the item resulting in a faded color.

14. The computer-implemented method of claim 1, wherein the intended color of the item is diminished by the temporary object obscuring the item.

15. The computer-implemented method of claim 1, wherein the intended color of the item is diminished by the environmental factor obscuring the intended color of the item.

16. A computer-implemented method, comprising:

receiving an activity to be performed in an area;

analyzing the activity for implementing the method, wherein the analyzing comprises determining whether the activity to be performed includes an area that is not designated for the activity;

receiving an image of the area pertinent to the activity;

identifying an item pertinent to the activity in the area;

determining an intended color of the item according to a predefined color code;

analyzing the image for determining if the intended color of the item is diminished on and/or absent from the item; and outputting a mixed reality (MR) image of the area in which the intended color is overlayed on the item in response to determining that the intended color of the item is diminished and/or absent.

17. The computer-implemented method of claim 16, wherein the item is selected from the group consisting of: an object, an area of a floor, and an infrastructure.

18. The computer-implemented method of claim 16, wherein a camera associated with a user captures the image, wherein the method is implemented on an apparatus worn by the user, wherein the apparatus comprises the camera and a display for outputting the MR image of the area.

19. The computer-implemented method of claim 16, wherein a camera associated with a user captures an image, wherein the user is selected from the group consisting of: a human and a robot.

20. A Mixed Reality (MR)-based system, comprising:

a head-mounted MR translucent display;

a camera coupled to the head-mounted MR display;

a processor; and logic integrated with the processor, executable by the processor, or integrated with and executable by the processor, the logic being configured to:

connect to an augmented reality (AR) system for identifying items present in an area as depicted in an image captured by the camera and outputted to the display;

connect to a predefined color code rule; and connect to a machine learning network module for:

determining an intended color of one of the items according to the predefined color code rule, analyzing the image for determining if the intended color of the item is diminished on and/or absent from the item, wherein the intended color of the item is diminished by at least one cause selected from the group consisting of: age of the item resulting in a faded color, a temporary object obscuring the item, and an environmental factor obscuring the intended color of the item, and modifying the intended color in the image of the item present in the area according to the predefined color code rule, wherein the intended color is overlayed onto the item in the image depicted on the MR display.

* * * * *